(12) United States Patent
Naitoh et al.

(10) Patent No.: US 9,688,940 B2
(45) Date of Patent: Jun. 27, 2017

(54) LUBRICATING THERMOPLASTIC RESIN COMPOSITION AND FORMED ARTICLE THEREOF

(71) Applicant: UMG ABS, LTD., Chuo-ku, Tokyo (JP)

(72) Inventors: Yoshitaka Naitoh, Ube (JP); Kousaku Tao, Ube (JP); Tomonori Takase, Ube (JP); Risa Nii, Ube (JP); Yoshiaki Shinohara, Ube (JP); Keiichi Yagi, Ube (JP); Nobutaka Hase, Ube (JP)

(73) Assignee: UMG ABS, LTD., Tokyo (JP)

( * ) Notice: Subject to any disclaimer, the term of this patent is extended or adjusted under 35 U.S.C. 154(b) by 229 days.

(21) Appl. No.: 14/389,177

(22) PCT Filed: Apr. 5, 2013

(86) PCT No.: PCT/JP2013/060443
§ 371 (c)(1),
(2) Date: Sep. 29, 2014

(87) PCT Pub. No.: WO2013/154040
PCT Pub. Date: Oct. 17, 2013

(65) Prior Publication Data
US 2015/0057201 A1  Feb. 26, 2015

(30) Foreign Application Priority Data

Apr. 13, 2012 (JP) .................................. 2012-092150

(51) Int. Cl.
*C10M 169/04* (2006.01)
*C08F 212/10* (2006.01)
(Continued)

(52) U.S. Cl.
CPC ............. *C10M 169/04* (2013.01); *C08F 2/44* (2013.01); *C08F 8/18* (2013.01); *C08F 8/42* (2013.01);
(Continued)

(58) Field of Classification Search
CPC .................................. C08L 25/12; C08L 33/08
(Continued)

(56) References Cited

U.S. PATENT DOCUMENTS 5,654,366 A    8/1997 Furukawa et al.
5,798,403 A *  8/1998 Yamashita ............ C08F 279/02
                                                524/447
(Continued)

FOREIGN PATENT DOCUMENTS

JP    H02-279729 A    11/1990
JP    H04-173863 A     6/1992
(Continued)

OTHER PUBLICATIONS

Europe Patent Office, "Search Report for EP13775379.4," Nov. 12, 2015.
(Continued)

*Primary Examiner* — Ellen McAvoy
(74) *Attorney, Agent, or Firm* — Manabu Kanesaka (57) ABSTRACT

[Object] To provide lubricating thermoplastic resin compositions that can give formed articles exhibiting excellent lubricating properties and surface appearance and maintaining the lubricating properties permanently.
[Solution] The lubricating thermoplastic resin composition includes an acid-modified copolymer (A) of a monomer mixture including an aromatic vinyl and a vinyl cyanide, the copolymer having a carboxyl group in the molecular chain, and a functionalized lubricant (B) having, in the molecule, a functional group (B1) capable of reacting with the carboxyl group and a lubricating segment (B2) having lubricating properties. The composition may further include a graft copolymer (C) and/or an additional thermoplastic resin (D) other than the acid-modified copolymer (A).

13 Claims, 1 Drawing Sheet

(51) Int. Cl.

| | | |
|---|---|---|
| C08L 25/12 | (2006.01) | |
| C08F 2/44 | (2006.01) | |
| C10M 155/02 | (2006.01) | |
| C08F 279/04 | (2006.01) | |
| C10M 145/04 | (2006.01) | |
| C10M 145/12 | (2006.01) | |
| C10M 145/16 | (2006.01) | |
| C10M 147/04 | (2006.01) | |
| C10M 149/04 | (2006.01) | |
| C08F 8/18 | (2006.01) | |
| C08F 8/42 | (2006.01) | |
| C10M 107/42 | (2006.01) | |
| C10M 131/10 | (2006.01) | |
| C10M 131/12 | (2006.01) | |
| C10M 133/06 | (2006.01) | |
| C10M 143/02 | (2006.01) | |

(52) U.S. Cl.
CPC .......... *C08F 212/10* (2013.01); *C08F 279/04* (2013.01); *C08L 25/12* (2013.01); *C10M 145/04* (2013.01); *C10M 145/12* (2013.01); *C10M 145/16* (2013.01); *C10M 147/04* (2013.01); *C10M 149/04* (2013.01); *C10M 155/02* (2013.01); *C10M 169/041* (2013.01); *C10M 107/42* (2013.01); *C10M 131/10* (2013.01); *C10M 131/12* (2013.01); *C10M 133/06* (2013.01); *C10M 143/02* (2013.01); *C10M 2205/022* (2013.01); *C10M 2209/04* (2013.01); *C10M 2209/08* (2013.01); *C10M 2209/086* (2013.01); *C10M 2211/042* (2013.01); *C10M 2211/044* (2013.01); *C10M 2213/04* (2013.01); *C10M 2215/04* (2013.01); *C10M 2217/0265* (2013.01); *C10M 2217/06* (2013.01); *C10M 2229/02* (2013.01); *C10M 2229/05* (2013.01); *C10M 2229/052* (2013.01); *C10N 2230/06* (2013.01); *C10N 2250/18* (2013.01)

(58) Field of Classification Search
USPC ........................................................ 525/222
See application file for complete search history.

(56) References Cited

U.S. PATENT DOCUMENTS

| 6,274,243 | B1 * | 8/2001 | Nakajima | ............... C08L 25/12 |
| | | | | 428/423.5 |
| 6,512,077 | B1 * | 1/2003 | Miyamoto | ............. C08F 6/001 |
| | | | | 528/196 |
| 6,716,917 | B2 * | 4/2004 | Kido | ....................... C08L 25/14 |
| | | | | 525/78 |
| 7,351,766 | B2 * | 4/2008 | Nabeshima | ............. C08L 51/00 |
| | | | | 525/148 |
| 7,589,142 | B2 * | 9/2009 | Maeda | .................. C08F 210/00 |
| | | | | 524/444 |
| 8,084,538 | B2 * | 12/2011 | Mawatari | ................ C08L 67/02 |
| | | | | 525/166 |
| 8,222,344 | B2 * | 7/2012 | Jin | .......................... C08L 25/12 |
| | | | | 525/221 |
| 8,507,609 | B2 * | 8/2013 | Jin | ......................... C08F 212/10 |
| | | | | 525/222 |
| 8,742,015 | B2 * | 6/2014 | Higaki | .................... C08L 25/12 |
| | | | | 525/199 |
| 9,365,716 | B2 * | 6/2016 | Ueda | ....................... C08L 67/02 |
| 2010/0010114 | A1 | 1/2010 | Myung et al. | |
| 2012/0231265 | A1 | 9/2012 | Haruta et al. | |

FOREIGN PATENT DOCUMENTS

| JP | H06-220277 A | 8/1994 |
| JP | H08-003455 A | 1/1996 |
| JP | H09-067473 A | 3/1997 |
| JP | 2688619 B2 | 12/1997 |
| JP | H10-287702 A | 10/1998 |
| JP | H10-316833 A | 12/1998 |
| JP | 2011-168186 A | 9/2011 |
| JP | 2011-174029 A | 9/2011 |
| WO | 2012/090941 A1 | 7/2012 |

OTHER PUBLICATIONS

Japan Patent Office, "Office Action for JP 2012-092150," Sep. 15, 2015.
PCT, "International Search Report for International Application No. PCT/JP2013/060443".
Kobunshi Tenkazai no Shin Tenkai, The Nikkan Kogyo Shinbun, Ltd., Sep. 30, 1998, pp. 155 to 158.
Japan Patent Office, "Opposition for Japanese Patent No. 5919987," Nov. 16, 2016.

* cited by examiner

LUBRICATING THERMOPLASTIC RESIN COMPOSITION AND FORMED ARTICLE THEREOF

FIELD OF INVENTION

The present invention relates to lubricating thermoplastic resin compositions that can give shaped articles exhibiting excellent lubricating properties and surface appearance and maintaining the lubricating properties permanently, and to formed articles of the compositions.

BACKGROUND OF INVENTION

Rubber-reinforced thermoplastic resin compositions represented by ABS resins have well-balanced impact resistance, mechanical properties and shaping processability, and such thermoplastic resin compositions are widely used in various fields such as office automation equipment, automobiles and sundry goods. However, ABS resins are amorphous resins and thus have a large friction coefficient (dynamic friction coefficient, amplitude of dynamic friction coefficient) compared to crystalline resins such as polyethylene, polypropylene and polyacetal. Consequently, a stick-slip phenomenon occurs between objects such as switch members of OA equipment and car audio system members fitted to each other, due to vibrations of the equipment or vibrations of automobiles during starting and driving, producing a squeaking sound.

The friction coefficient (dynamic friction coefficient, amplitude of dynamic friction coefficient) of rubber-reinforced thermoplastic resin compositions is conventionally reduced by the addition of lubricants such as polytetrafluoroethylene, silicones and polyethylene. For example, it has been proposed that rubber-reinforced thermoplastic resin compositions be mixed with lubricants such as silicones (Patent Literature 1), silicones having a specific viscosity (Patent Literature 2), and polytetrafluoroethylene or polyethylene (Patent Literature 3).

This approach involving the addition of these lubricants increases the lubricating properties of shaped articles by allowing the lubricants blended in the rubber-reinforced thermoplastic resin compositions to bleed out on the surface of shaped articles, thereby reducing the friction coefficient. As a result of this, the lubricants that have bled out deteriorate the surface appearance of shaped articles. Further, the lubricating properties are decreased with time due to the gradual loss of the lubricants that have bled out.

LIST OF LITERATURE

Patent Literature

Patent Literature 1: Japanese Patent 2688619
Patent Literature 2: Japanese Patent Publication 2011-174029 A
Patent Literature 3: Japanese Patent Publication 2011-168186 A

OBJECT OF INVENTION

An object of the present invention is to provide lubricating thermoplastic resin compositions that can give formed articles exhibiting excellent lubricating properties and surface appearance and maintaining the lubricating properties permanently.

SUMMARY OF INVENTION

The present inventors carried out extensive studies to achieve the above object. As a result, the present inventors have developed a composition that contains an acid-modified copolymer of a monomer mixture including an aromatic vinyl and a vinyl cyanide, the copolymer having a carboxyl group in the molecular chain, and a lubricant having a functional group capable of reacting with the carboxyl group. With this configuration, the lubricant is bonded to the copolymer by the reaction between the carboxyl groups in the copolymer and the functional groups in the lubricant. Consequently, it becomes possible to prevent a loss of the lubricant that has bled out on the surface of shaped articles with time, and the composition can maintain lubricating properties permanently. Further, the lubricant bonded to the copolymer is dispersed and fixed in the inside of shaped articles. Because there is no bleeding out of the lubricant, the appearance of shaped articles is not deteriorated and the shaped articles can maintain excellent surface appearance.

The present invention has been achieved based on the above findings. A summary of the invention is as follows.

[1] A lubricating thermoplastic resin composition including an acid-modified copolymer (A) of a monomer mixture including an aromatic vinyl and a vinyl cyanide, the copolymer having a carboxyl group in the molecular chain, and a functionalized lubricant (B) having, in a molecule thereof, a functional group (B1) capable of reacting with the carboxyl group and a lubricating segment (B2) having lubricating properties.

[2] The lubricating thermoplastic resin composition described in [1], wherein the functional group (B1) in the functionalized lubricant (B) is any of an amino group, a hydroxyl group, an epoxy group and a carboxylic acid anhydride group.

[3] The lubricating thermoplastic resin composition described in [1] or [2], wherein the lubricating segment (B2) in the functionalized lubricant (B) is any of a perfluoroalkyl group, a polysiloxane chain and a polyethylene chain.

[4] The lubricating thermoplastic resin composition described in [2] or [3], wherein the functionalized lubricant (B) is one, or two or more selected from the group consisting of perfluoroalkyl compounds, silicones and polyethylenes which are each modified with any of an amino group, a hydroxyl group, an epoxy group and a carboxylic acid anhydride group.

[5] The lubricating thermoplastic resin composition described in any of [1] to [4], further including a graft copolymer (C) and/or an additional thermoplastic resin (D) other than the acid-modified copolymer (A).

[6] The lubricating thermoplastic resin composition described in any of [1] to [4], wherein the composition contains the functionalized lubricant (B) in an amount of 0.01 to 25 parts by mass with respect to 100 parts by mass of the acid-modified copolymer (A).

[7] The lubricating thermoplastic resin composition described in [5], wherein the composition contains the functionalized lubricant (B) in an amount of 0.01 to 25 parts by mass with respect to 100 parts by mass of the total of the acid-modified copolymer (A) plus the graft copolymer (C) and/or the additional thermoplastic resin (D).

[8] The lubricating thermoplastic resin composition described in any of [1] to [7], wherein the acid-modified copolymer (A) has a carboxyl group only at an end of the molecular chain, this acid-modified copolymer (A) being produced by copolymerizing a monomer mixture including an aromatic vinyl and a vinyl cyanide with use of a carboxyl group-containing organic peroxide, a carboxyl group-containing azo polymerization initiator or a carboxyl group-containing photopolymerization initiator.

[9] The lubricating thermoplastic resin composition described in [8], wherein the acid-modified copolymer (A) has an acid value of 1 to 30 mg-KOH/g.

[10] The lubricating thermoplastic resin composition described in any of [1] to [7], wherein the acid-modified copolymer (A) has carboxyl groups inside the molecular chain and at an end of the molecular chain, this acid-modified copolymer (A) being produced by copolymerizing a monomer mixture including an aromatic vinyl, a vinyl cyanide and a carboxyl group-containing radically polymerizable monomer with use of a carboxyl group-containing organic peroxide, a carboxyl group-containing azo polymerization initiator or a carboxyl group-containing photopolymerization initiator.

[11] The lubricating thermoplastic resin composition described in [10], wherein the acid-modified copolymer (A) has an acid value of 1 to 130 mg-KOH/g.

[12] The lubricating thermoplastic resin composition described in any of [8] to [11], wherein the content of the aromatic vinyl in the monomer mixture is 60 to 95 mass % relative to 100 mass % of the monomer mixture, and the content of the vinyl cyanide is 5 to 40 mass % relative to 100 mass % of the monomer mixture.

[13] The lubricating thermoplastic resin composition described in any of [1] to [12], wherein the weight average molecular weight of the acid-modified copolymer (A) is 40000 to 450000.

[14] A formed article obtained by forming the lubricating thermoplastic resin composition described in any of [1] to [13].

Advantageous Effects of Invention

The lubricating thermoplastic resin compositions of the present invention can give shaped articles exhibiting excellent lubricating properties and surface appearance and maintaining the lubricating properties permanently. Further, such shaped articles may be provided by the invention.

DESCRIPTION OF EMBODIMENTS

Figure 1:
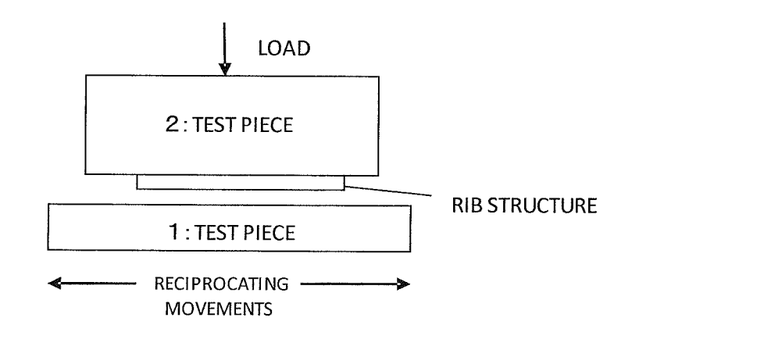
The FIGURE is a view illustrating a method for evaluating lubricating properties in EXAMPLES.

Embodiments of the present invention will be described in detail hereinbelow.

[Lubricating Thermoplastic Resin Compositions]

The lubricating thermoplastic resin composition of the invention includes an acid-modified copolymer (A) of a monomer mixture including an aromatic vinyl and a vinyl cyanide, the copolymer having a carboxyl group in the molecular chain, and a functionalized lubricant (B) having, in the molecule, a functional group (B1) capable of reacting with the carboxyl group and a lubricating segment (B2) having lubricating properties. In addition to the acid-modified copolymer (A) and the functionalized lubricant (B), the composition may further include a graft polymer (C) and/or an additional thermoplastic resin (D) other than the acid-modified copolymer (A), and may further contain additives in accordance with, for example, use applications and mechanical properties that are required.

<Acid-Modified Copolymers (A)>

The acid-modified copolymer (A) in the invention is a copolymer of a monomer mixture including an aromatic vinyl and a vinyl cyanide, and has a carboxyl group in its molecular chain.

The acid-modified copolymer (A) may have a carboxyl group inside the molecular chain of the acid-modified copolymer (A) (namely, in the molecular chain except the ends), at an end of the molecular chain, or at both of these positions. Advantageously, the acid-modified copolymer (A) has a carboxyl group only at an end of the molecular chain, because such a copolymer does not form a crosslinked structure by the reaction between the carboxyl groups and consequently the obtainable lubricating thermoplastic resin composition can give shaped articles having good appearance.

The acid-modified copolymer (A) having a carboxyl group only inside the molecular chain (the acid-modified copolymer (A) having a carboxyl group in the molecular chain of the acid-modified copolymer (A) except the ends of the molecular chain) may be produced by copolymerizing a monomer mixture including a carboxyl group-containing radically polymerizable monomer, an aromatic vinyl and a vinyl cyanide.

The acid-modified copolymer (A) having a carboxyl group only at an end of the molecular chain may be produced by copolymerizing a monomer mixture including an aromatic vinyl and a vinyl cyanide with use of a carboxyl group-containing organic peroxide, a carboxyl group-containing azo polymerization initiator or a carboxyl group-containing photopolymerization initiator.

Further, the acid-modified copolymer (A) having carboxyl groups inside the molecular chain and at an end of the molecular chain may be produced by copolymerizing a monomer mixture including an aromatic vinyl, a vinyl cyanide and a carboxyl group-containing radically polymerizable monomer with use of a carboxyl group-containing organic peroxide, a carboxyl group-containing azo polymerization initiator or a carboxyl group-containing photopolymerization initiator.

In the production of the acid-modified copolymer (A), the amount of the carboxyl groups introduced into the inside of the molecular chains of the acid-modified copolymer (A) may be controlled by controlling the amount in which the carboxyl group-containing radically polymerizable monomer is added to the monomer mixture.

The amount of the carboxyl groups introduced at ends of the molecular chains of the acid-modified copolymer (A) may be controlled by controlling the amount of the use of the carboxyl group-containing organic peroxide, the carboxyl group-containing azo polymerization initiator or the carboxyl group-containing photopolymerization initiator, or by controlling the reaction temperature during the copolymerization.

Examples of the aromatic vinyls used in the production of the acid-modified copolymers (A) in the invention include styrene, α-methylstyrene, o-, m- or p-methylstyrene, vinylxylene, p-t-butylstyrene and ethylstyrene. Of these, styrene and α-methylstyrene are preferable. These aromatic vinyls may be used singly, or two or more may be used as a mixture.

The content of the aromatic vinyl in the monomer mixture is not particularly limited, and may be selected appropriately in accordance with, for example, use applications and mechanical properties that are required. It is, however, generally preferable that the content be 60 to 95 mass % relative to 100 mass % of the monomer mixture. This content of the aromatic vinyl in the monomer mixture ensures that the shaping processability of the obtainable lubricating thermoplastic resin composition will be enhanced and the impact resistance of shaped articles will be improved.

Examples of the vinyl cyanides include acrylonitrile and methacrylonitrile. The vinyl cyanides may be used singly, or two or more may be used as a mixture.

The content of the vinyl cyanide in the monomer mixture is not particularly limited, and may be selected appropriately in accordance with, for example, use applications and mechanical properties that are required. It is, however, generally preferable that the content be 5 to 40 mass % relative to 100 mass % of the monomer mixture. This content of the vinyl cyanide in the monomer mixture ensures that the obtainable lubricating thermoplastic resin composition will give shaped articles having enhanced impact resistance.

The monomer mixture may include an additional monomer copolymerizable with the aromatic vinyl and the vinyl cyanide while still achieving the advantageous effects of the invention.

Examples of the additional monomers include α,β-unsaturated carboxylate esters such as methyl (meth)acrylate, ethyl (meth)acrylate, propyl (meth)acrylate, butyl (meth) acrylate, 2-ethyl (meth)acrylate and 2-ethylhexyl methacrylate; and maleimides such as N-cyclohexylmaleimide and N-phenylmaleimide. These additional monomers may be used singly, or two or more may be used as a mixture.

In the invention, "(meth)acrylate" indicates "acrylate" and "methacrylate".

For use in the production of the acid-modified copolymers (A) having a carboxyl group inside the molecular chain, examples of the carboxyl group-containing radically polymerizable monomers include acrylic acid, methacrylic acid, o-, m- or p-vinylbenzoic acid, cinnamic acid, fumaric acid and maleic acid. These carboxyl group-containing radically polymerizable monomers may be used singly, or two or more may be used as a mixture.

The amount in which the carboxyl group-containing radically polymerizable monomer is used is variable depending on the molecular weight of the carboxyl group-containing radically polymerizable monomer. Although the amount is not particularly limited, the radically polymerizable monomer is preferably used in such an amount that the acid value of the obtainable acid-modified copolymer (A) will be 1 to 100 mg-KOH/g. If the acid value of the acid-modified copolymer (A) is less than 1 mg-KOH/g, the lubricating thermoplastic resin composition of the invention tends to fail to maintain lubricating properties permanently. If the acid value exceeds 100 mg-KOH/g, the appearance of shaped articles tends to be deteriorated.

Here, the term "acid value" indicates the mass in mg of potassium hydroxide required to neutralize the protonic acid present in 1 g of the copolymer, and is measured in accordance with JIS K 2501.

For use in the production of the acid-modified copolymers (A) having a carboxyl group only at an end of the molecular chain, examples of the carboxyl group-containing organic peroxides include bis(3-carboxypropionyl)peroxide and 4-(tert-butylperoxy)-4-oxo-2-butenoic acid; examples of the carboxyl group-containing azo polymerization initiators include 4,4'-azobis(4-cyanovaleric acid) and 2,2-azobis[N-(2-carboxyethyl)-2-methylpropionamidine]; and examples of the carboxyl group-containing photopolymerization initiators include 2-benzoylbenzoic acid and 3-benzoylbenzoic acid. These may be used singly, or two or more may be used as a mixture.

The acid value of the acid-modified copolymer (A) having a carboxyl group only at an end of the molecular chain is preferably 1 to 30 mg-KOH/g. Thus, the acid-modified copolymer (A) having a carboxyl group only at an end of the molecular chain is preferably produced using the carboxyl group-containing organic peroxide, azo polymerization initiator or photopolymerization initiator so that the obtainable acid-modified copolymer (A) will have such an acid value. If the acid value of the acid-modified copolymer (A) having a carboxyl group only at an end of the molecular chain is less than 1 mg-KOH/g, the lubricating thermoplastic resin composition of the invention tends to fail to maintain lubricating properties permanently. If the acid value exceeds 30 mg-KOH/g, the production of the acid-modified copolymer (A) having a carboxyl group only at an end of the molecular chain disadvantageously requires a large amount of the carboxyl group-containing organic peroxide, azo polymerization initiator or photopolymerization initiator.

It is usually preferable that the acid value of the acid-modified copolymer (A) having carboxyl groups inside the molecular chain and at an end of the molecular chain be 1 to 130 mg-KOH/g, for the same reasons as the acid values of the acid-modified copolymer (A) having a carboxyl group inside the molecular chain and the acid-modified copolymer (A) having a carboxyl group only at an end of the molecular chain.

The weight average molecular weight of the acid-modified copolymer (A) of the invention is preferably 40000 to 450000, and more preferably 40000 to 400000. If the weight average molecular weight of the acid-modified copolymer (A) is less than 40000, the obtainable lubricating thermoplastic resin composition will give shaped articles with poor appearance. Any weight average molecular weight exceeding 450000 leads to poor lubricating properties. Here, the weight average molecular weight of the acid-modified copolymer (A) is a polystyrene equivalent molecular weight measured by GPC (gel permeation chromatography, solvent: tetrahydrofuran (THF)).

In the production of the acid-modified copolymer (A) in the invention, the monomer mixture may be polymerized by any of usual methods without limitation. Examples of the general polymerization methods include bulk polymerization, solution polymerization, bulk suspension polymerization, suspension polymerization and emulsion polymerization.

<Functionalized lubricants (B)>

The functionalized lubricant (B) used in the invention has, in the molecule, a functional group (B1) capable of reacting with the carboxyl group and a lubricating segment (B2) having lubricating properties.

Examples of the functional groups (B1) capable of reacting with the carboxyl group include amino groups, hydroxyl groups, epoxy groups, carboxylic acid anhydride groups, carboxyl groups, mercapto groups and oxetane ring groups. Of these, amino groups, hydroxyl groups, epoxy groups and carboxylic acid anhydride groups are preferable from the viewpoint of the reactivity with the carboxyl groups in the acid-modified copolymer (A). The functional groups (B1) capable of reacting with the carboxyl group may be present inside the molecular chain of the functionalized lubricant (B), only at an end of the molecular chain, or at both of these positions. Further, the functionalized lubricant (B) may have one, or two or more kinds of the functional groups (B1) capable of reacting with the carboxyl group.

In the functionalized lubricant (B), as described later, the number of the functional groups (B1) capable of reacting with the carboxyl group is variable depending on the type of the lubricating segment (B2) of the functionalized lubricant (B) that has lubricating properties.

The lubricating segments (B2) of the functionalized lubricants (B) are not particularly limited as long as the segments exhibit lubricating properties. Preferred examples include perfluoroalkyl groups, polysiloxane chains and polyethylene chains. That is, the functionalized lubricant (B) in the invention is preferably a perfluoroalkyl compound, a silicone or a polyethylene having a functional group (B1) capable of reacting with the carboxyl group, such as an amino group, a hydroxyl group, an epoxy group, a carboxylic acid anhydride group, a carboxyl group, a mercapto group or an oxetane ring group, and preferably an amino group, a hydroxyl group, an epoxy group or a carboxylic acid anhydride group.

Examples of the functionalized lubricants (B) having a perfluoroalkyl group as the lubricating segment (B2) include those represented by General Formulae (1a) to (3a) below in which the functional group (B1) is a monovalent functional group, and those represented by General Formulae (1b) to (3b) below in which the functional group (B1) is a divalent functional group such as an epoxy group or a carboxylic acid anhydride group.

In General Formulae (1a) to (3a) and (1b) to (3b), n is usually an integer of 1 to 40, and preferably 1 to 20; and m and m' are integers satisfying m+m'=n. If n (=m+m') exceeds the above upper limit, the melting point of the compound is increased to deteriorate the dispersibility of the compound in the lubricating thermoplastic resin composition. As a result, the obtainable shaped articles tend not only to exhibit low lubricating properties but also to have poor appearance.

X indicates the functional group (B1) capable of reacting with the carboxyl group and, as mentioned earlier, may be, for example, an amino group, a hydroxyl group, an epoxy group, a carboxylic acid anhydride group, a carboxyl group, a mercapto group or an oxetane ring group, and preferably an amino group, a hydroxyl group, an epoxy group or a carboxylic acid anhydride group.

R is not limited to any particular chemical structure as long as it can bond, for example, the perfluoroalkyl group $C_nF_{(2n+1)}$ or the perfluoroalkyl groups $C_mF_{(2m'+1)}$ and $C_{(m-m')}F_{(2m-2m'+1)}$ in General Formula (2a) or (3a) to X, namely the functional group (B1) capable of reacting with the carboxyl group. Examples of such structures include a methylene group, a phenylene group, a naphthylene group, an oxyethylene group, a methine group, a trivalent benzene ring group, a trivalent naphthalene ring group, and a group resulting from the removal of one hydrogen atom from the oxyethylene group.

Examples of the functionalized lubricants (B) having a polysiloxane chain as the lubricating segment (B2) include silicones such as dimethyl silicone, diphenyl silicone, methyl phenyl silicone and methyl vinyl silicone which have a functional group (B1) capable of reacting with the carboxyl group at an end, at both ends, inside the molecular chain or at some of these positions. The number of the functional groups (B1) is preferably such that the functional group equivalent weight is 100 to 6000 g/mol. Here, the functional group equivalent weight is the mass of the main skeletons (the polysiloxane chains) bonded to 1 mol of the functional groups. Examples of the functional groups (B1) capable of reacting with the carboxyl group include, as mentioned earlier, an amino group, a hydroxyl group, an epoxy group, a carboxylic acid anhydride group, a carboxyl group, a mercapto group and an oxetane ring group, with an amino group, a hydroxyl group and a carboxylic acid anhydride group being preferred.

The functionalized lubricants (B) having a polysiloxane chain as the lubricating segment (B2), namely, the functionalized lubricants (B) that are composed of silicones having a functional group (B1) capable of reacting with the carboxyl group preferably have a dynamic viscosity of 10 to 1000 mm$^2$/s from the viewpoint of the dispersibility in the lubricating thermoplastic resin composition. Here, the dynamic viscosity of the functionalized lubricants (B) is a value measured with an Ubbelohde viscometer at 25° C. in accordance with ASTM D445-46T.

Examples of the functionalized lubricants (B) having a polyethylene chain as the lubricating segment (B2) include polyethylenes grafted with vinyl compounds having a functional group (B1) capable of reacting with the carboxyl group, and copolymers of ethylene with vinyl compounds having a functional group (B1) capable of reacting with the carboxyl group.

Examples of the vinyl compounds having a functional group (B1) capable of reacting with the carboxyl group include vinylamine, vinyl alcohol, glycidyl (meth)acrylate, maleic acid anhydride, acrylic acid and methacrylic acid, with vinylamine, vinyl alcohol, glycidyl (meth)acrylate and maleic acid anhydride being preferred.

In the functionalized lubricant (B) having a polyethylene chain as the lubricating segment (B2), the number of the functional groups (B1) capable of reacting with the carboxyl group is preferably such that the functional group equivalent weight is 100 to 6000 g/mol. Here, the functional group equivalent weight is the mass of the main skeletons (the polyethylene chains) bonded to 1 mol of the functional groups.

From the viewpoint of the dispersibility in the lubricating thermoplastic resin composition, the functionalized lubricant (B) having a polyethylene chain as the lubricating segment (B2) preferably has a viscosity average molecular weight of 1000 to 9000, and more preferably 1500 to 4000. Here, the viscosity average molecular weight is a value measured in accordance with JIS K 7367-3.

<Graft copolymers (C)>

The lubricating thermoplastic resin composition of the invention preferably contains a graft copolymer (C). Containing the graft polymer (C), the lubricating thermoplastic resin composition of the invention can give shaped articles which not only exhibit excellent appearance and lubricating properties and maintain the lubricating properties permanently, but also achieve excellent impact resistance.

The graft polymer (C) is a graft copolymer of a rubbery polymer with a monomer mixture including an aromatic vinyl and a vinyl cyanide.

Examples of the rubbery polymers include natural rubbers, polybutadienes, styrene-butadiene rubbers, acrylonitrile-butadiene rubbers, acrylic rubbers, silicone rubbers, silicone-acrylic rubbers and ethylene-propylene-non conjugated diene copolymer rubbers (EPDM). These rubbery polymers may be used singly, or two or more may be used as a mixture. Examples of the diolefins contained in the EPDM include dicyclopentadiene, 1,4-hexadiene, 1,4-heptadiene, 1,5-cyclooctadiene, 6-methyl-1,5-heptadiene, 11-ethyl-1,11-tridecadiene, 5-methylene-2-norbornene, 5-ethylidene-2-norbornene, 2,5-norbornadiene, 2-methyl-2,5-norbornadiene, methyltetrahydroindene and limonene. These may be used singly, or two or more may be used as a mixture.

The aromatic vinyl constituting the monomer mixture used in the production of the graft polymer (C) may be similar to any of such compounds used for the production of the acid-modified copolymer (A). The aromatic vinyls may be used singly, or two or more may be used as a mixture.

The content of the aromatic vinyl in 100 mass % of the monomer mixture is not particularly limited, and may be selected appropriately in accordance with, for example, use applications and mechanical properties that are required. In rubber-reinforced thermoplastic resins represented by ABS resins, it is generally preferable that the content of the aromatic vinyl be 60 to 95 mass % relative to 100 mass % of the monomer mixture. This content of the aromatic vinyl in the monomer mixture ensures that the shaping processability of the obtainable lubricating thermoplastic resin composition will be enhanced and the impact resistance of shaped articles will be improved.

The vinyl cyanide constituting the monomer mixture used in the production of the graft polymer (C) may be similar to any of such compounds used for the production of the acid-modified copolymer (A). The vinyl cyanides may be used singly, or two or more may be used as a mixture.

The content of the vinyl cyanide in 100 mass % of the monomer mixture is not particularly limited, and may be selected appropriately in accordance with, for example, use applications and mechanical properties that are required. In rubber-reinforced thermoplastic resins represented by ABS resins, it is generally preferable that the content of the vinyl cyanide be 5 to 40 mass % relative to 100 mass % of the monomer mixture. This content of the vinyl cyanide in the monomer mixture ensures that the obtainable lubricating thermoplastic resin composition will give shaped articles having enhanced impact resistance.

The monomer mixture used in the production of the graft polymer (C) may include an additional monomer copolymerizable with the aromatic vinyl and the vinyl cyanide while still achieving the advantageous effects of the invention. The additional monomers may be similar to those used in the production of the acid-modified copolymer (A). The additional monomers may be used singly, or two or more may be used as a mixture.

The production of the graft polymer (C) involves 40 to 80 parts by mass of the rubbery polymer and 20 to 60 parts by mass of the monomer mixture (wherein the total of the rubbery polymer and the monomer mixture is 100 parts by mass). This proportion of the rubbery polymer ensures that the lubricating thermoplastic resin composition of the invention obtained with the graft copolymer (C) achieves excellent impact resistance.

The graft polymer (C) may be produced by any of usual methods without limitation. Examples of the general polymerization methods include bulk polymerization, solution polymerization, bulk suspension polymerization, suspension polymerization and emulsion polymerization.

<Additional thermoplastic resins (D)>

The additional thermoplastic resins (D) used in the lubricating thermoplastic resin composition of the invention are not particularly limited as long as the resins may be alloyed with rubber-reinforced thermoplastic resins typically represented by ABS resins, AES resins and SAS resins. Examples include SAN resins obtained by copolymerizing the monomer mixture used in the production of the acid-modified copolymer (A) optionally together with other copolymerizable monomers, styrene-acrylonitrile-α-methylstyrene copolymer, styrene-acrylonitrile-N-phenylmaleimide copolymer, polymethyl methacrylate resins, polycarbonate resins, polyamide resins, polyphenylene ether resins, polyethylene terephthalate resins, polybutylene terephthalate resins and polylactic acid resins. In particular, SAN resins, styrene-acrylonitrile-α-methylstyrene copolymer and styrene-acrylonitrile-N-phenylmaleimide copolymer are preferable. The additional thermoplastic resins (D) may be used singly, or two or more may be used as a mixture.

<Other Components>

In addition to the aforementioned components, the lubricating thermoplastic resin composition of the invention may further contain one, or two or more selected from various additives commonly used in the production (mixing) and shaping of resin compositions, such as lubricating agents, pigments, dyes, fillers (such as carbon black, silica, titanium oxide, glass fibers and carbon fibers), heat stabilizers, oxidation degradation inhibitors, weather stabilizers, releasing agents, plasticizers, antistatic agents and flame retardants, without impairing the properties of the composition.

<Mixing Proportions>

The content of the functionalized lubricant (B) in the lubricating thermoplastic resin composition of the invention is preferably 0.01 to 25 parts by mass, and particularly preferably 0.1 to 10 parts by mass with respect to 100 parts by mass of the resin component(s) in the lubricating thermoplastic resin composition. With less than 0.01 parts by mass of the functionalized lubricant (B), the lubricating thermoplastic resin composition tends to exhibit insufficient lubricating properties. If the content exceeds 25 parts by mass, the appearance of shaped articles tends to be deteriorated.

In the case where the lubricating thermoplastic resin composition of the invention does not contain the graft copolymer (C) or the additional thermoplastic resin (D), the resin component(s) in the lubricating thermoplastic resin composition of the invention indicates the acid-modified copolymer (A). When the lubricating thermoplastic resin composition of the invention contains the acid-modified copolymer (A), and the graft copolymer (C) and/or the additional thermoplastic resin (D), the resin component(s) indicates the total of the acid-modified copolymer (A), and the graft copolymer (C) and/or the additional thermoplastic resin (D).

When the lubricating thermoplastic resin composition of the invention contains the graft copolymer (C), the content of the graft polymer (C) is not particularly limited, and may be selected appropriately in accordance with, for example, use applications and mechanical properties that are required. It is, however, preferable that the graft polymer (C) be added such that the content of the rubbery polymer in the lubricating thermoplastic resin composition will be 3 to 30 parts by mass with respect to 100 parts by mass of the resin components in the lubricating thermoplastic resin composition of the invention. If the content of the rubbery polymer in the lubricating thermoplastic resin composition is less than the lower limit, the improvement in the impact resistance of the obtainable shaped articles is insufficient. If the content exceeds the upper limit, the appearance of shaped articles is deteriorated.

When the lubricating thermoplastic resin composition of the invention contains the additional thermoplastic resin (D), the amount thereof is not particularly limited, and may be selected appropriately in accordance with, for example, use applications and mechanical properties that are required.

<Production Methods>

The lubricating thermoplastic resin compositions of the invention may be produced by any methods without limitation, using common techniques and apparatuses. An example of the general methods is a melt mixing method involving an apparatus such as an extruder, a Banbury mixer, a roller or a kneader. The production system may be batchwise or continuous. The components may be mixed together in any order without limitation as long as all the components are mixed together to sufficient uniformity.

[Lubricating Thermoplastic Resin Formed Articles]

Formed articles of the invention are obtained by forming the aforementioned lubricating thermoplastic resin compositions of the invention.

Exemplary methods for forming the inventive lubricating thermoplastic resin compositions include injection molding methods, injection compression molding methods, extrusion methods, blow molding methods, vacuum forming methods, pressure forming methods, calendering methods and blown-film extrusion methods. Of these, injection molding methods and injection compression molding methods are preferable because these methods can produce shaped articles with high dimensional accuracy in a large volume.

The formed articles of the invention have excellent lubricating properties and maintain the lubricating properties permanently, and thus may be suitably used in sliding parts in OA equipment, automobile members and the like.

EXAMPLES

EXAMPLES of the present invention will be described below. The scope of the invention is not limited to such EXAMPLES as long as the spirit of the invention is retained.

Production Example 1

Acid-Modified Copolymer (A-1)

170 Parts by mass of distilled water and 2.0 parts by mass of sodium alkylbenzenesulfonate were maintained at an inside temperature of 75° C., and 0.2 parts by mass of sodium pyrophosphate and 0.25 parts by mass of potassium persulfate were added thereto. Next, a monomer mixture including 68 parts by mass of styrene, 27 parts by mass of acrylonitrile and 5 parts by mass of methacrylic acid was added simultaneously with 0.3 parts by mass of t-dodecylmercaptane dropwise over a period of 360 minutes, thereby performing polymerization. During this process, the inside temperature was maintained constant at 75° C. After the completion of the dropwise addition, the reaction system was maintained at 75° C. for another 100 minutes and was thereafter cooled to terminate the polymerization. The reaction product in the form of a latex was coagulated with an aqueous calcium chloride solution, and the coagulated product was washed with water and was dried to afford an acid-modified copolymer (A-1).

The acid-modified copolymer (A-1) had a weight average molecular weight of 135000 and an acid value of 31 mg-KOH/g.

Production Example 2

Acid-Modified Copolymer (A-2)

An acid-modified copolymer (A-2) was obtained by the same method as in the production of the acid-modified copolymer (A-1) in PRODUCTION EXAMPLE 1, except that the amount of t-dodecylmercaptane added was changed to 1.0 part by mass.

The acid-modified copolymer (A-2) had a weight average molecular weight of 33000 and an acid value of 30 mg-KOH/g.

Production Example 3

Acid-Modified Copolymer (A-3)

An acid-modified copolymer (A-3) was obtained by the same method as in the production of the acid-modified copolymer (A-1) in PRODUCTION EXAMPLE 1, except that the amount of t-dodecylmercaptane added was changed to 0.8 parts by mass.

The acid-modified copolymer (A-3) had a weight average molecular weight of 52000 and an acid value of 32 mg-KOH/g.

Production Example 4

Acid-Modified Copolymer (A-4)

An acid-modified copolymer (A-4) was obtained by the same method as in the production of the acid-modified copolymer (A-1) in PRODUCTION EXAMPLE 1, except that the amount of t-dodecylmercaptane added was changed to 0.05 parts by mass.

The acid-modified copolymer (A-4) had a weight average molecular weight of 370000 and an acid value of 31 mg-KOH/g.

Production Example 5

Acid-Modified Copolymer (A-5)

An acid-modified copolymer (A-5) was obtained by the same method as in the production of the acid-modified copolymer (A-1) in PRODUCTION EXAMPLE 1, except that t-dodecylmercaptane was not added.

The acid-modified copolymer (A-5) had a weight average molecular weight of 430000 and an acid value of 30 mg-KOH/g.

Production Example 6

Acid-Modified Copolymer (A-6)

250 Parts by mass of distilled water and 2.0 parts by mass of sodium alkylbenzenesulfonate were maintained at an inside temperature of 80° C., and 2.0 parts by mass of 4,4'-azobis(4-cyanovaleric acid) was added thereto. Next, a monomer mixture including 70 parts by mass of styrene and 30 parts by mass of acrylonitrile was added simultaneously with 0.5 parts by mass of t-dodecylmercaptane dropwise over a period of 150 minutes, thereby performing polymerization. During this process, the inside temperature was maintained constant at 80° C. After the completion of the dropwise addition, the reaction system was maintained at 80° C. for 60 minutes and was thereafter cooled to terminate the polymerization. The reaction product in the form of a latex was coagulated with an aqueous calcium chloride solution, and the coagulated product was washed with water and was dried to afford an acid-modified copolymer (A-6).

The acid-modified copolymer (A-6) had a weight average molecular weight of 79000 and an acid value of 6 mg-KOH/g.

Production Example 7

Acid-Modified Copolymer (A-7)

An acid-modified copolymer (A-7) was obtained by the same production method as in PRODUCTION EXAMPLE 1, except that the monomer mixture included 69.85 parts by mass of styrene, 30 parts by mass of acrylonitrile and 0.15 parts by mass of methacrylic acid.

The acid-modified copolymer (A-7) had a weight average molecular weight of 140000 and an acid value of 0.8 mg-KOH/g.

Production Example 8

Acid-Modified Copolymer (A-8)

An acid-modified copolymer (A-8) was obtained by the same production method as in PRODUCTION EXAMPLE 1, except that the monomer mixture included 69.8 parts by mass of styrene, 30 parts by mass of acrylonitrile and 0.2 parts by mass of methacrylic acid.

The acid-modified copolymer (A-8) had a weight average molecular weight of 145000 and an acid value of 1.2 mg-KOH/g.

Production Example 9

Acid-Modified Copolymer (A-9)

An acid-modified copolymer (A-9) was obtained by the same production method as in PRODUCTION EXAMPLE 1, except that the monomer mixture included 63 parts by mass of styrene, 22 parts by mass of acrylonitrile and 15 parts by mass of methacrylic acid.

The acid-modified copolymer (A-9) had a weight average molecular weight of 135000 and an acid value of 95 mg-KOH/g.

Production Example 10

Acid-Modified Copolymer (A-10)

An acid-modified copolymer (A-10) was obtained by the same production method as in PRODUCTION EXAMPLE 1, except that the monomer mixture included 62 parts by mass of styrene, 21 parts by mass of acrylonitrile and 17 parts by mass of methacrylic acid.

The acid-modified copolymer (A-10) had a weight average molecular weight of 140000 and an acid value of 105 mg-KOH/g.

Production Example 11

Acid-Modified Copolymer (A-11)

An acid-modified copolymer (A-11) was obtained by the same production method as in PRODUCTION EXAMPLE 6, except that the amounts of 4,4'-azobis(4-cyanovaleric acid) and t-dodecylmercaptane were changed to 0.3 parts by mass and 1 part by mass, respectively.

The acid-modified copolymer (A-11) had a weight average molecular weight of 121000 and an acid value of 0.8 mg-KOH/g.

Production Example 12

Acid-Modified Copolymer (A-12)

An acid-modified copolymer (A-12) was obtained by the same production method as in PRODUCTION EXAMPLE 6, except that the amounts of 4,4'-azobis(4-cyanovaleric acid) and t-dodecylmercaptane were changed to 0.4 parts by mass and 1 part by mass, respectively.

The acid-modified copolymer (A-12) had a weight average molecular weight of 102000 and an acid value of 1.2 mg-KOH/g.

Production Example 13

Graft Copolymer (C-1)

To 170 parts by mass of distilled water were added 70 parts by mass (in terms of solid content) of a polybutadiene rubber latex (gel content: 95%, average particle diameter: 3000 Å), 30 parts by mass of a monomer mixture including 70 mass % styrene and 30 mass % acrylonitrile, 1 part by mass of disproportionated potassium rosinate, 0.01 parts by mass of sodium hydroxide, 0.45 parts by mass of sodium pyrophosphate, 0.01 parts by mass of ferrous sulfate, 0.57 parts by mass of dextrose, 0.08 parts by mass of t-dodecylmercaptane and 1.0 part by mass of cumene hydroperoxide. The reaction was started from 60° C. During the course of the reaction, the temperature was raised to 75° C., and the emulsion graft polymerization was completed after 2.5 hours. The reaction product in the form of a latex was coagulated with an aqueous sulfuric acid solution, and the coagulated product was washed with water and was dried to afford a graft copolymer (C-1).

Production Example 14

Thermoplastic Resin (D-1)

To 120 parts by mass of distilled water were added 0.003 parts by mass of sodium alkylbenzenesulfonate, 68 parts by mass of styrene, 32 parts by mass of acrylonitrile, 0.35 parts by mass of t-dodecylmercaptane, 0.15 parts by mass of benzoyl peroxide and 0.5 parts by mass of calcium phosphate. Suspension polymerization was performed at 110° C. for 10 hours, resulting in a thermoplastic resin (D-1) that was an SAN resin.

1H,1H,2H,2H-heptadecafluoro-1-decanol manufactured by TOKYO CHEMICAL INDUSTRY CO., LTD. was used as a hydroxyl-modified perfluoroalkyl group-containing compound (B-1).

2,2,3,3,4,4,5,5,6,6,7,7,8,8,8-Pentadecafluorooctane-1-amine manufactured by Wako Pure Chemical Industries, Ltd. was used as an amino-modified perfluoroalkyl group-containing compound (B-2).

1,2-Epoxy-1H,1H,2H,3H,3H-heptadecafluoroundecane manufactured by Wako Pure Chemical Industries, Ltd. was used as an epoxy-modified perfluoroalkyl group-containing compound (B-3).

Perfluorononanoic acid manufactured by Wako Pure Chemical Industries, Ltd. was used as a carboxyl-modified perfluoroalkyl group-containing compound (B-4).

Perfluorononane manufactured by TOKYO CHEMICAL INDUSTRY CO., LTD. was used as an unmodified perfluoroalkyl compound (B-5).

A silicone terminated with an amine at both ends: product name KF-8012 (dynamic viscosity: 90 mm$^2$/s, amino group content: functional group equivalent weight=2200 g/mol) manufactured by Shin-Etsu Chemical Co., Ltd. was used as an amino-modified silicone (B-6).

A silicone terminated with an epoxy at both ends: product name X-22-163B (dynamic viscosity: 60 mm$^2$/s, epoxy group content: functional group equivalent weight=1750 g/mol) manufactured by Shin-Etsu Chemical Co., Ltd. was used as an epoxy-modified silicone (B-7).

A silicone terminated with a carboxylic acid at both ends: product name X-22-162C (dynamic viscosity: 220 mm$^2$/s, carboxyl group content: functional group equivalent weight=2300 g/mol) manufactured by Shin-Etsu Chemical Co., Ltd. was used as a carboxyl-modified silicone (B-8).

Dimethylsilicone: product name KF-96-100cs (dynamic viscosity: 100 mm$^2$/s) manufactured by Shin-Etsu Chemical Co., Ltd. was used as an unmodified silicone (B-9).

Hi-Wax 2203A (viscosity average molecular weight: 3000, maleic acid anhydride group content: functional group equivalent weight=1870 g/mol) manufactured by Mitsui Chemicals, Inc. was used as a maleic acid anhydride-modified polyethylene (B-10).

Hi-Wax 320P (viscosity average molecular weight: 3000) manufactured by Mitsui Chemicals, Inc. was used as an unmodified polyethylene (B-11).

Mitsubishi Carbon Black manufactured by Mitsubishi Chemical Corporation was used as a filler (CB).

Examples 1 to 27 and Comparative Examples 1 to 5

The components shown in the chemical compositions (parts by mass) in Tables 1 to 4, and 0.5 parts by mass of the filler (CB) were mixed together. The mixtures were melt-kneaded at 230° C. with a 30 mm twin-screw extruder ("TEX-30a" manufactured by THE JAPAN STEEL WORKS, LTD.) to give lubricating thermoplastic resin compositions in the form of pellets.

The lubricating thermoplastic resin compositions obtained were injection molded into various articles (test pieces), which were tested by the following methods to evaluate lubricating properties, the permanence of lubricating properties, the appearance of molded articles, and impact resistance. The evaluation results are described in Tables 1 to 4.

<Lubricating Properties>

The test was performed by the method illustrated in the FIGURE.

A test piece 1 having a rib structure and a test piece 2 having a plane surface were used. Whether or not a squeaking sound was generated by reciprocating movements under a load of 500 g or 1 kg was examined, and lubricating properties were evaluated based on the following criteria.

⊚: Any squeaking sound was not generated under a load of both 500 g and 1 kg.

○: A slight squeaking sound was generated under a load of 1 kg, but no squeaking sound was generated under 500 g.

Δ: A slight squeaking sound was generated under a load of both 500 g and 1 kg.

x: A squeaking sound was generated under a load of both 500 g and 1 kg.

The test pieces were evaluated to have lubricating properties when the squeaking sound was slight (A) or nil under a load of 500 g or 1 kg.

<Permanence of Lubricating Properties>

The test was performed by the method illustrated in the FIGURE.

A test piece 1 having a rib structure and a test piece 2 having a plane surface were annealed at 60° C. for 10 days, and the surface of the test pieces 1 and 2 was degreased with isopropyl alcohol to remove any bleeding. The generation of a squeaking sound after the degreasing was examined by the same method as used in the above evaluation of lubricating properties, and the permanence of lubricating properties was evaluated based on the following criteria.

⊚: Any squeaking sound was not generated under a load of both 500 g and 1 kg.

○: A slight squeaking sound was generated under a load of 1 kg, but no squeaking sound was generated under 500 g.

Δ: A slight squeaking sound was generated under a load of both 500 g and 1 kg.

x: A squeaking sound was generated under a load of both 500 g and 1 kg.

The test pieces were evaluated to have a permanence of lubricating properties when the squeaking sound was slight (Δ) or nil under a load of 500 g or 1 kg.

<Appearance of Shaped Articles>

The surface of 100×100 mm shaped articles (thickness 2 mm) was tested on a digital goniophotometer "UGV-5D" manufactured by Suga Test Instruments Co., Ltd. to measure the reflectance at an incident angle of 60° and a reflection angle of 60°. The higher the reflectance, the higher the surface gloss and the better the appearance of the shaped articles.

<Impact Resistance>

The V-notch Charpy impact strength (kJ/m$^2$) was measured under conditions of 23° C. and 4 mm in accordance with the ISO test method 179.

TABLE 1

| | | | EXAMPLES | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Chemical compositions (parts by mass) | Acid-modified copolymers (A) | A-1 | 100 | | | | | | | | | | | |
| | | A-2 | | 100 | | | | | | | | | | |
| | | A-3 | | | 100 | | | | | | | | | |
| | | A-4 | | | | 100 | | | | | | | | |
| | | A-5 | | | | | 100 | | | | | | | |

TABLE 1-continued

|  |  |  | EXAMPLES | | | | | | | | | | | |
|---|---|---|---|---|---|---|---|---|---|---|---|---|---|---|
|  |  |  | 1 | 2 | 3 | 4 | 5 | 6 | 7 | 8 | 9 | 10 | 11 | 12 |
|  |  | A-6 |  |  |  |  |  | 100 |  |  |  |  |  |  |
|  |  | A-7 |  |  |  |  |  |  | 100 |  |  |  |  |  |
|  |  | A-8 |  |  |  |  |  |  |  | 100 |  |  |  |  |
|  |  | A-9 |  |  |  |  |  |  |  |  | 100 |  |  |  |
|  |  | A-10 |  |  |  |  |  |  |  |  |  | 100 |  |  |
|  |  | A-11 |  |  |  |  |  |  |  |  |  |  | 100 |  |
|  |  | A-12 |  |  |  |  |  |  |  |  |  |  |  | 100 |
|  | Functionalized lubricant (B) | B-1 | 1 | 1 | 1 | 1 | 1 | 1 | 1 | 1 | 1 | 1 | 1 | 1 |
| Evaluation results | Lubricating properties (squeaking sound) | Before degreasing | ◎ | ◎ | ◎ | ◎ | Δ | ◎ | ◎ | ◎ | ◎ | ◎ | ◎ | ◎ |
|  |  | After degreasing | ◎ | ◎ | ◎ | ◎ | Δ | ◎ | Δ | ◎ | ◎ | ◎ | Δ | ◎ |
|  | Appearance of shaped articles (reflectance (%)) |  | 93 | 86 | 92 | 92 | 93 | 98 | 93 | 92 | 91 | 84 | 97 | 98 |
|  | Impact resistance (Charpy impact strength (kJ/m$^2$)) |  | 2 | 2 | 2 | 2 | 2 | 2 | 2 | 2 | 2 | 2 | 2 | 2 |

TABLE 2

|  |  |  | EXAMPLES | | | | | | | | | |
|---|---|---|---|---|---|---|---|---|---|---|---|---|
|  |  |  | 13 | 14 | 15 | 16 | 17 | 18 | 19 | 20 | 21 | 22 |
| Chemical compositions (parts by mass) | Acid-modified copolymers (A) | A-1 | 100 | 100 | 100 | 100 | 100 | 100 | 100 | 100 | 100 | 100 |
|  | Functionalized lubricant (B) | B-1 |  |  |  |  |  |  |  | 0.5 | 18 | 22 |
|  |  | B-2 | 1 |  |  |  |  |  |  |  |  |  |
|  |  | B-3 |  | 1 |  |  |  |  |  |  |  |  |
|  |  | B-4 |  |  | 1 |  |  |  |  |  |  |  |
|  |  | B-6 |  |  |  | 1 |  |  |  |  |  |  |
|  |  | B-7 |  |  |  |  | 1 |  |  |  |  |  |
|  |  | B-8 |  |  |  |  |  | 1 |  |  |  |  |
|  |  | B-10 |  |  |  |  |  |  | 1 |  |  |  |
| Evaluation results | Lubricating properties (squeaking sound) | Before degreasing | ◎ | ◎ | ◎ | ◎ | ◎ | ◎ | ◎ | ◎ | ◎ | ◎ |
|  |  | After degreasing | ◎ | ◎ | ○ | ◎ | ○ | ○ | ◎ | ◎ | ◎ | ◎ |
|  | Appearance of shaped articles (reflectance (%)) |  | 93 | 92 | 89 | 92 | 92 | 88 | 93 | 93 | 92 | 78 |
|  | Impact resistance (Charpy impact strength (kJ/m$^2$)) |  | 2 | 2 | 2 | 2 | 2 | 2 | 2 | 2 | 2 | 2 |

TABLE 3

|  |  |  | EXAMPLES | | | | |
|---|---|---|---|---|---|---|---|
|  |  |  | 23 | 24 | 25 | 26 | 27 |
| Chemical compositions (parts by mass) | Acid-modified copolymers (A) | A-1 | 10 | 10 | 10 | 10 | 10 |
|  | Functionalized lubricant (B) | B-1 | 1 | 1 | 1 | 1 | 1 |
|  | Graft copolymer (C) | C-1 | 3 | 5 | 25 | 40 | 45 |
|  | Additional thermoplastic resin (D) | D-1 | 87 | 85 | 65 | 50 | 45 |
| Evaluation results | Lubricating properties (squeaking sound) | Before degreasing | ◎ | ◎ | ◎ | ◎ | ◎ |
|  |  | After degreasing | ◎ | ◎ | ◎ | ◎ | ◎ |
|  | Appearance of shaped articles (reflectance (%)) |  | 93 | 92 | 92 | 91 | 88 |
|  | Impact resistance (Charpy impact strength (kJ/m$^2$)) |  | 2 | 5 | 18 | 41 | 42 |

TABLE 4

|  |  |  | COMPARATIVE EXAMPLES | | | | |
|---|---|---|---|---|---|---|---|
|  |  |  | 1 | 2 | 3 | 4 | 5 |
| Chemical compositions (parts by mass) | Acid-modified copolymers (A) | A-1 |  | 100 | 100 | 100 | 100 |
|  | Functionalized lubricant (B) | B-1 | 1 |  |  |  |  |
|  |  | B-5 |  | 1 |  |  |  |
|  |  | B-9 |  |  | 1 |  |  |
|  |  | B-11 |  |  |  | 1 |  |
|  | Additional thermoplastic resin (D) | D-1 | 100 |  |  |  |  |
| Evaluation results | Lubricating properties (squeaking sound) | Before degreasing | ⊚ | ⊚ | ⊚ | ⊚ | X |
|  |  | After degreasing | X | X | X | X | X |
|  | Appearance of shaped articles (reflectance (%)) |  | 83 | 82 | 82 | 82 | 93 |
|  | Impact resistance (Charpy impact strength (kJ/m$^2$)) |  | 2 | 2 | 2 | 2 | 2 |

According to the present invention, as demonstrated in EXAMPLES 1 to 27 shown in Tables 1 to 3, lubricating thermoplastic resin compositions may be provided that can give shaped articles exhibiting excellent lubricating properties and surface appearance and maintaining the lubricating properties permanently, and also such shaped articles may be obtained. By controlling the amounts of the graft copolymer (C) and the additional thermoplastic resin (D), the shaped articles further achieve excellent impact resistance.

On the other hand, COMPARATIVE EXAMPLE 1 in Table 4 resulted in a failure to maintain the lubricating properties permanently because of the absence of the acid-modified copolymer (A). In COMPARATIVE EXAMPLES 2 to 4, the permanence of lubricating properties was not obtained because the functionalized lubricants (B) did not have a functional group (B1) capable of reacting with the carboxyl group. COMPARATIVE EXAMPLE 5 resulted in poor lubricating properties and poor permanence of lubricating properties because of the absence of the functionalized lubricant (B).

Although the present invention has been described in detail with respect to some specific embodiments, the skilled person will appreciate that various modifications are possible within the spirit and the scope of the invention.

This application is based upon Japanese patent application 2012-092150 filed on Apr. 13, 2012, the entire contents of which are incorporated herein by reference.

REFERENCE SIGNS LIST 1, 2 Test pieces

The invention claimed is:

1. A lubricating thermoplastic resin composition comprising an acid-modified copolymer (A) and a functionalized lubricant (B),
the acid-modified copolymer (A) being a copolymer of a monomer mixture including an aromatic vinyl and a vinyl cyanide,
the acid-modified copolymer (A) having a carboxyl group in a molecular chain and an acid value of 1 to 130 mg-KOH/g, and
the functionalized lubricant (B) having, in a molecule thereof, a functional group (B1) capable of reacting with the carboxyl group and a lubricating segment (B2) having lubricating properties.

2. The lubricating thermoplastic resin composition according to claim 1, wherein the functional group (B1) in the functionalized lubricant (B) is any of an amino group, a hydroxyl group, an epoxy group and a carboxylic acid anhydride group.

3. The lubricating thermoplastic resin composition according to claim 1, wherein the lubricating segment (B2) in the functionalized lubricant (B) is any of a perfluoroalkyl group, a polysiloxane chain and a polyethylene chain.

4. The lubricating thermoplastic resin composition according to claim 2, wherein the functionalized lubricant (B) is at least one selected from the group consisting of perfluoroalkyl compounds, silicones and polyethylenes which are each modified with any of an amino group, a hydroxyl group, an epoxy group and a carboxylic acid anhydride group.

5. The lubricating thermoplastic resin composition according to claim 1, further comprising a graft copolymer (C) and/or an additional thermoplastic resin (D) other than the acid-modified copolymer (A).

6. The lubricating thermoplastic resin composition according to claim 1, wherein the composition contains the functionalized lubricant (B) in an amount of 0.01 to 25 parts by mass with respect to 100 parts by mass of the acid-modified copolymer (A).

7. The lubricating thermoplastic resin composition according to claim 5, wherein the composition contains the functionalized lubricant (B) in an amount of 0.01 to 25 parts by mass with respect to 100 parts by mass of the total of the acid-modified copolymer (A) plus the graft copolymer (C) and/or the additional thermoplastic resin (D).

8. The lubricating thermoplastic resin composition according to claim 1, wherein the acid-modified copolymer (A) has the carboxyl group only at an end of the molecular chain, the acid-modified copolymer (A) being produced by copolymerizing the monomer mixture including the aromatic vinyl and the vinyl cyanide with use of a carboxyl group-containing organic peroxide, a carboxyl group-containing azo polymerization initiator or a carboxyl group-containing photopolymerization initiator.

9. The lubricating thermoplastic resin composition according to claim 8, wherein the acid-modified copolymer (A) has the acid value of 1 to 30 mg-KOH/g.

10. The lubricating thermoplastic resin composition according to claim 1, wherein the acid-modified copolymer (A) has carboxyl groups inside the molecular chain and at an end of the molecular chain, the acid-modified copolymer (A) being produced by copolymerizing the monomer mixture including the aromatic vinyl, the vinyl cyanide and a carboxyl group-containing radically polymerizable monomer with use of a carboxyl group-containing organic peroxide, a carboxyl group-containing azo polymerization initiator or a carboxyl group-containing photopolymerization initiator.

11. The lubricating thermoplastic resin composition according to claim 8, wherein a content of the aromatic vinyl in the monomer mixture is 60 to 95 mass % relative to 100 mass % of the monomer mixture, and a content of the vinyl cyanide is 5 to 40 mass % relative to 100 mass % of the monomer mixture.

12. The lubricating thermoplastic resin composition according to claim 1, wherein a weight average molecular weight of the acid-modified copolymer (A) is 40000 to 450000.

13. A formed article obtained by forming the lubricating thermoplastic resin composition described in claim 1.

\* \* \* \* \*